(12) United States Patent
King et al.

(10) Patent No.: US 11,514,233 B2
(45) Date of Patent: Nov. 29, 2022

(54) AUTOMATED NONPARAMETRIC CONTENT ANALYSIS FOR INFORMATION MANAGEMENT AND RETRIEVAL

(71) Applicant: PRESIDENT AND FELLOWS OF HARVARD COLLEGE, Cambridge, MA (US)

(72) Inventors: Gary King, Brookline, MA (US); Connor T. Jerzak, Somerville, MA (US); Anton Strezhnev, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 812 days.

(21) Appl. No.: 16/415,065

(22) PCT Filed: Nov. 16, 2017

(86) PCT No.: PCT/US2017/061983
§ 371 (c)(1),
(2) Date: May 17, 2019

(87) PCT Pub. No.: WO2018/098009
PCT Pub. Date: May 31, 2018

(65) Prior Publication Data
US 2019/0377784 A1 Dec. 12, 2019

Related U.S. Application Data

(60) Provisional application No. 62/425,131, filed on Nov. 22, 2016.

(51) Int. Cl.
*G06F 40/151* (2020.01)
*G06V 30/418* (2022.01)
*G06K 9/62* (2022.01)

(52) U.S. Cl.
CPC ......... *G06F 40/151* (2020.01); *G06K 9/6247* (2013.01); *G06K 9/6268* (2013.01); *G06V 30/418* (2022.01)

(58) Field of Classification Search
CPC .. G06F 40/151; G06K 9/6268; G06K 9/6247; G06V 30/418
(Continued)

(56) References Cited
U.S. PATENT DOCUMENTS 6,490,573 B1 12/2002 Njemanze
7,024,400 B2 4/2006 Tokuda et al.
(Continued)

OTHER PUBLICATIONS

International Search Report and Written Opinion for International Application No. PCT/US2017/061983 dated Feb. 6, 2018, 8 pages.

*Primary Examiner* — Jeffery A Williams
(74) *Attorney, Agent, or Firm* — Morgan, Lewis & Bockius LLP

(57) ABSTRACT

Embodiments of the invention utilize a feature-extraction approach and/or a matching approach in combination with a nonparametric approach to estimate the proportion of documents in each of multiple labeled categories with high accuracy. The feature-extraction approach automatically generates continuously valued text features optimized for estimating the category proportions, and the matching approach constructs a matched set that closely resembles a data set that is unobserved based on an observed set, thereby improving the degree to which the distributions of the observed and unobserved sets resemble each other.

40 Claims, 13 Drawing Sheets

(58) Field of Classification Search
USPC .............................................................. 706/9
See application file for complete search history.

(56) References Cited

U.S. PATENT DOCUMENTS

| | | |
|---|---|---|
| 7,890,438 B2 | 2/2011 | Chidlovskii |
| 2002/0022956 A1 | 2/2002 | Ukrainczyk et al. |
| 2011/0085728 A1* | 4/2011 | Gao .................... G06V 10/462 |
| | | 382/165 |
| 2012/0215784 A1* | 8/2012 | King .................... G06K 9/6256 |
| | | 707/E17.046 |
| 2014/0012855 A1 | 1/2014 | Firat et al. |

\* cited by examiner

AUTOMATED NONPARAMETRIC CONTENT ANALYSIS FOR INFORMATION MANAGEMENT AND RETRIEVAL

CROSS-REFERENCE TO RELATED APPLICATION

This application is a U.S. National Phase Application of PCT/US2017/061983, filed Nov. 16, 2017, which claims priority to and the benefit of, and incorporates herein by reference in its entirety, U.S. Provisional Patent Application No. 62/425,131, which was filed on Nov. 22, 2016. The foregoing applications are incorporated herein by reference in their entireties.

FIELD OF THE INVENTION

The field of the invention relates, generally, to systems and methods for content analysis of documents and, more particularly, to content analysis using a nonparametric estimation approach.

BACKGROUND

A vast literature in computer science and statistics develops methods to automatically classify textual documents into a set of mutually exclusive and exhaustive categories and analyze the documents in each category. In contrast, social scientists are less interested in specific documents in an individual classification; rather, they often seek aggregate generalizations about populations of documents, such as the profile or distribution of the documents within the various categories. This task is sometimes referred to as document "quantification."

One conventional approach for document quantification utilizes a parametric "classify-and-count" method. This approach, however, is highly model-dependent and may rely on a perfect classifier that is unrealistic in real applications and unnecessary for aggregate accuracy if individual-level errors cancel. In addition, the classify-and-count approach generally involves choosing a classifier by trying to maximize the proportion of individual documents correctly classified; this often yields biased estimates of statistical aggregates. For example, in many applications, a method that classifies 60% of documents correctly would be judged successful, and useful for individual classification (i.e., representing approximately how often a GOOGLE or BING search returned what was desired), but since this means that category percentages can be off by as much as 40 percentage points the same classifier may be useless for social science purposes.

In addition, the conventional approach begins document quantification and classification by analyzing a small subset of documents with category labels (which generally are hand-coded); it then assumes that a set of unanalyzed, unlabeled elements is drawn from the same population as that of the labeled set for calibrating class probabilities. Commonly, however, the labeled set may be created in one time period while the unlabeled set may be collected during a subsequent time period and may have a different distribution. As a result, the document quantification obtained using this approach may be inaccurate.

Another document-quantification approach utilizes direct estimation of the category proportions to avoid the problems associated with the classify-and-count approach. Generally, this approach estimates category percentages without resorting to individual classifications as a first step, thereby providing better results in applications such as text analysis for political science. The direct-estimation approach, however, also remains imperfect. For example, it suffers when there is a lack of textual discrimination (i.e., the meaning and usage of language is too similar across categories) or when there is a "concept drift" (i.e., the meaning and usage of language is too different between the training and test data sets).

Accordingly, there is a need for an approach that can provide estimates of document quantifications in the presence of concept drift as well as the absence of textual discrimination without being highly model-dependent.

SUMMARY

Embodiments of the present invention involve applying feature extraction and/or matching in combination with nonparametric estimation to estimate the proportion of documents in each of a plurality of labeled categories with improved accuracy and computational performance compared to conventional approaches. More specifically, feature extraction and/or matching may advantageously reduce the effective divergence (such as the concept drift) between two data sets while increasing textual discrimination between different categories and/or different textual features so as to increase the precision and, in most cases, the accuracy of estimation. In one embodiment, feature extraction creates a continuous feature space that effectively discriminates among categories and contains as many non-redundant or independent features as possible. In one embodiment, feature extraction utilizes a projection matrix that projects a document-feature matrix in the feature space (i.e., the space whose dimensions correspond to document features) onto a lower-dimensional subspace matrix (which may be custom-configured for a particular application or document type). The projection may be linear, nonlinear or random. In addition, the projection matrix may be optimized to maximize an equally weighted sum of a category-discrimination metric and a feature-discrimination metric. This approach may effectively reduce estimation errors resulting from lack of textual discrimination, as in prior approaches. In addition, matching may be utilized to construct a matched set that closely resembles an unlabeled (or unobserved) data set based on a labeled (or observed) set, thereby improving the resemblance between the distributions of the labeled and unlabeled sets. In some embodiments, matching first identifies, for each document in the unlabeled set, three nearest neighbors, defined in a Euclidean space, among the documents from the labeled set. In addition, other documents in the labeled set that are closer than the median nearest neighbor among the three nearest neighbors of all documents in the unobserved set may be identified. Any documents in the labeled set that are not identified in the above manner are pruned out for analysis. As a result, this approach advantageously addresses concept drift and proportion divergence. By applying feature extraction and/or matching, estimations of category proportions may be significantly improved without the need for tuning or using model-dependent classification methods developed in particular fields for their quantities of interest. Embodiments of the invention may improve accuracy in applications relating to item categorization and classification, interpretation (e.g., of the content of the items and what this suggests), and/or retrieval of computational and real objects subject to automated analysis.

Accordingly, in one aspect, the invention pertains to a method of computationally estimating a proportion of data elements in multiple data categories. In various embodiments, the method includes (a) receiving and electronically storing the first set of elements, each element in the first set being computationally assigned to one of the categories and having one of the feature profiles computationally associated therewith; (b) receiving and electronically storing the second set of elements, each element in the second set having one of the feature profiles computationally associated therewith; (c) computationally defining a continuous feature space having multiple numerical variables representing the feature profiles in the first set, the feature space being configured to discriminate between the categories and the feature profiles; (d) computationally constructing, based at least in part on the first set, a matched set that substantially resembles the second set, each element in the matched set being associated with multiple numerical variables representing multiple feature profiles associated therewith; and (e) estimating a distribution of the elements in the second set over the categories based at least in part on (i) the numerical variables associated with the feature profiles in the matched set and (ii) the feature profiles associated with the elements in the second set.

The method may further include computationally creating, with respect to the feature space, an element-feature matrix data structure having rows for at least some of the elements in the first and second sets and columns for the feature profiles associated therewith. In addition, the method may include computationally creating a projection matrix data structure for projecting the element-feature matrix onto a lower-dimensional subspace matrix data structure; the distribution of the elements in the second set over the categories is estimated based at least in part on the numerical variables in the lower-dimensional subspace matrix data structure. In one implementation, the method further includes optimizing the projection matrix by maximizing an equally weighted sum of a category-discrimination metric and a feature-discrimination metric. For example, the projection matrix may be optimized using the Hooke-Jeeves algorithm. In addition, the projection may be linear, nonlinear or random.

In some embodiments, step (d) of the method includes (i) identifying, for each element in the second set, three nearest neighbors among the elements from the first set, and (ii) identifying the elements in the first set that are closer than a median nearest neighbor among the three nearest neighbors of all elements in the second set; the matched set is then constructed by pruning out the elements that are not identified in steps (i) and (ii) in the first set. In addition, the method may further include filtering the elements in the first set and/or second set as so to retain information of interest only. In various embodiments, the elements in the first and second sets include text; the method includes (i) converting the text to lowercase and removing punctuation marks, (ii) mapping a word to its stem and/or (iii) summarizing the feature profiles in the first set and/or second set as a set of dichotomous variables.

The distribution of the elements in the second set over the categories may not be constrained to be the same as the distribution of the elements in the first set over the categories. In addition, the distribution of the elements in the second set over the categories may be unbiased. Further, the distribution of the elements in the second set over the categories may be estimated without assigning the elements in the second set to the categories individually. In various embodiments, the method includes storing the distribution of the elements in the second set over the categories on a computer storage medium. The elements in the first and second sets may include text, audio, and/or video data encapsulated in files, streams, and/or database entries. The feature profiles may indicate whether certain words and/or combinations of words occur in the text. In one implementation, the text is unstructured. In some embodiments, the method further includes analyzing at least some of the elements in the first set or the second set to obtain the feature profiles associated with the elements.

In another aspect, the invention relates to an apparatus for computationally estimating a proportion of data elements in multiple data categories. In various embodiments, the apparatus includes a computer memory; a non-transitory storage device for data storage and retrieval; and a computer processor configured to (a) receive and electronically store the first set of elements in the memory, each element in the first set being computationally assigned to one of the categories and having one of the feature profiles computationally associated therewith; (b) receive and electronically storing a second set of elements in the memory, each element in the second set having one of the feature profiles computationally associated therewith; (c) computationally define a continuous feature space having multiple numerical variables representing the feature profiles in the first set, the feature space being configured to discriminate between the categories and the feature profiles; (d) computationally construct, based at least in part on the first set, a matched set that substantially resembles the second set, each element in the matched set being associated with multiple numerical variables representing multiple feature profiles associated therewith; and (e) estimate a distribution of the elements in the second set over the categories based at least in part on (i) the numerical variables associated with the feature profiles in the matched set and (ii) the feature profiles associated with the elements in the second set.

The computer processor may be further configured to computationally create, with respect to the feature space, an element-feature matrix data structure having rows for at least some of the elements in the first and second sets and columns for the feature profiles associated therewith. In addition, the computer processor may be configured to computationally create a projection matrix data structure for projecting the element-feature matrix onto a lower-dimensional subspace matrix data structure; the distribution of the elements in the second set over the categories is estimated based at least in part on the numerical variables in the lower-dimensional subspace matrix data structure. In one implementation, the computer processor is further configured to optimize the projection matrix by maximizing an equally weighted sum of a category-discrimination metric and a feature-discrimination metric. For example, the computer processor may be configured to optimize the projection matrix using the Hooke-Jeeves algorithm. In addition, the projection may be linear, nonlinear or random.

In some embodiments, the computer processor is further configured to (i) identify, for each element in the second set, three nearest neighbors among the elements from the first set, and (ii) identify the elements in the first set that are closer than a median nearest neighbor among the three nearest neighbors of all elements in the second set; the computer processor is then configured to construct the matched set by pruning out the elements that are not identified in steps (i) and (ii) in the first set. In addition, the computer processor may be configured to filter the elements in the first set and/or second set as so to retain information of interest only. In various embodiments, the elements in the first and second sets include text; the computer processor is further configured to (i) convert the text to lowercase and removing punctuation marks, (ii) map a word to its stem and/or (iii) summarize the feature profiles in the first set and/or second set as a set of dichotomous variables.

The distribution of the elements in the second set over the categories may not be constrained to be the same as a distribution of the elements in the first set over the categories. In addition, the distribution of the elements in the second set over the categories may be unbiased. Further, the computer processor may be configured to estimate the distribution of the elements in the second set over the categories without assigning the elements in the second set to the categories individually. In various embodiments, the computer processor is configured to store the distribution of the elements in the second set over the categories on the computer memory and/or the storage device. The elements in the first and second sets may include text, audio, and/or video data encapsulated in files, streams, and/or database entries. The feature profiles may indicate whether certain words and/or combinations of words occur in the text. In one implementation, the text is unstructured. In some embodiments, the computer processor is further configured to analyze at least some of the elements in the first set or the second set to obtain the feature profiles associated with the elements.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Embodiments of the present invention relate to nonparametric estimation of the proportion of documents in each of a plurality of labeled categories without necessarily classifying each individual document (although if desired, the nonparametric approach described herein may be used to improve individual classifications as well). Accuracy of the proportion estimations can be improved by applying feature extraction and/or matching in conjunction with nonparametric estimation as further described below.

Approaches for Estimating Quantification of Documents without Classification

Figure 1:
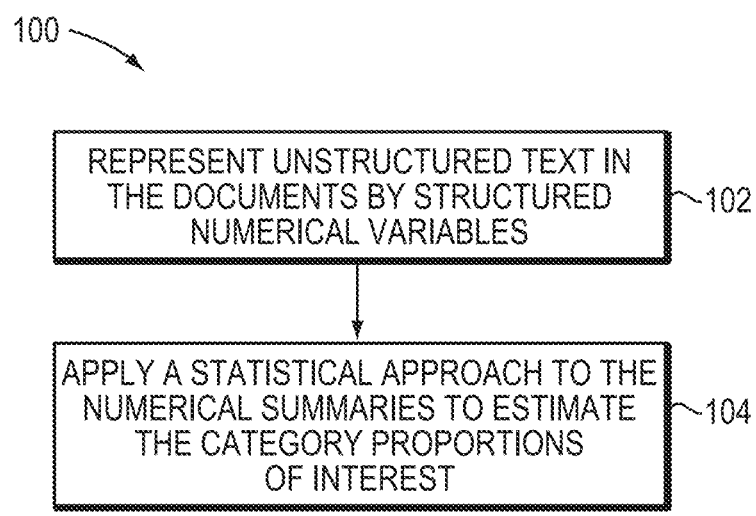
FIG. 1 is a flowchart of an exemplary nonparametric approach for estimating category proportions in a data set in accordance with various embodiments.

Referring to FIG. 1, in various embodiments, a nonparametric estimation method 100 for document quantifications involves two steps: representing unstructured text in the documents by structured numerical variables (step 102) and statistically analyzing the numerical summaries to estimate the category proportions of interest (step 104). Although the description herein refers to performing the nonparametric method 100 for estimating the proportion of textual documents only, it should be understood that the same approach generally applies as well to other information formats (e.g., audio, and/or video data encapsulated in files, streams, database entries, or any other suitable data format) and other sets of objects (e.g., people, deaths, attitudes, buildings, books, etc.) for which the goal is to estimate category proportions. In addition, the nonparametric method 100 may be applied to any structured, unstructured, and/or partially structured source data. Nonparametric estimation is generally described in U.S. Pat. No. 8,180,717, the entire disclosure of which is hereby incorporated by reference.

Figure 2:
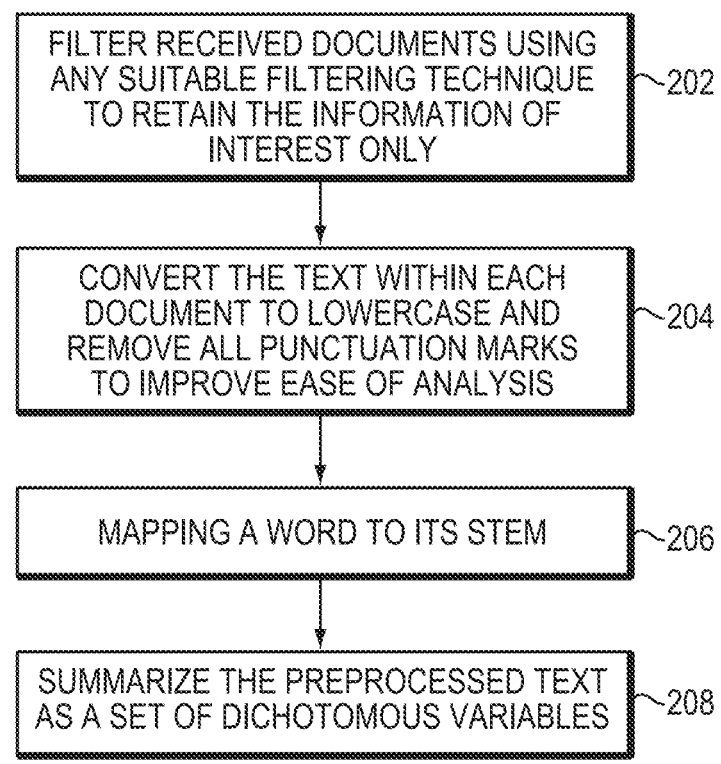
FIG. 2 is a flowchart of an exemplary approach for preprocessing data in a data set in accordance with various embodiments.

In various embodiments, step 102 includes receiving textual documents from a data source, such as an application, a storage medium, or any suitable device. Referring to FIG. 2, the received documents may be optionally preprocessed in one or more steps to reduce the complexity of the text. For example, the documents may be filtered using any suitable filtering technique to retain the information of interest only (step 202). In one embodiment, the filter is designed to retain English documents relating to a specific topic only. Although filtering is not required in the nonparametric method 100, it may help focus the documents on particular elements of interest, thereby reducing analysis time. In addition, to improve ease of analysis, the text within each document may be converted to lowercase and all punctuation marks may be removed (step 204). Further, the language complexity may be reduced by mapping a word to its stem. For example, the stemming process may reduce "consist," "consisted," "consistency," "consistent," "consistently," "consisting," and "consists" to their stem—i.e., "consist" (step 206). Finally, the preprocessed text may be summarized as a set of dichotomous variables: one type for the presence (coded 1) or absence (coded 0) of each word stem (or "unigram"), a second type for each word pair (or "bigram"), a third type of each word triplet (or "trigram"), and so on to all "n-grams" (step 208).

In various embodiments, a small set of the received documents is selected for labeling with one of a given number of categories (these may be referred to herein as "labeled documents" in a "labeled" set), while the rest of the received documents are unlabeled (and may be referred to herein as "unlabeled documents" in an "unlabeled" set). The labeled set may be chosen for having specific qualities or characteristics that differ in dramatic but specific ways from the characteristics of the broader population of the source data. Alternatively, the set of labeled documents may be randomly or pseudo-randomly selected. As used herein, a generic index, i, denotes a document in either the labeled or unlabeled set, and N denotes a generic description of the size of either set. The labeled and unlabeled sets include $N^L$ and $N^U$ documents, respectively, with $N^L$ and $N^U$ satisfying the relationship: $N^L+N^U=n$. Every document i in the labeled and unlabeled sets may fall into one category, c, of a set of mutually exclusive and exhaustive categories, $c \in \{1, \ldots, C\}$; this is denoted as: $D_i=c$. In various embodiments, each document in the labeled set is individually classified into one of the categories, C, using a suitable approach. For example, the classification may be performed by human reading and hand coding; alternatively, it may be performed using any suitable automated technique known to one of skill in the art. Thus, the documents in the labeled set have "observed" classifications, whereas documents in the unlabeled set have "unobserved" classifications. In some embodiments, the coding exists in the documents themselves. For example, the documents may include customers' ratings from 1 to 10 or from one star to five stars. The numbers from 1-10 or star numbers may then be the categories. The number of documents in category c in the labeled and unlabeled sets are denoted as $N_c^L$ and $N_c^U$, respectively, and $N_c$ refers to either set in category c. In addition, $N_c^L$ satisfies: $N_c^L = \Sigma N_{i=1}^{N^L} \mathcal{I}(D_i=c)$.

The proportion of the unlabeled documents in each category c is denoted as $\pi_c^U$, satisfying: $\pi_c^U = \text{mean}_{i \in U}[\mathcal{I}(D_i=c)]$, where for a set A with cardinality #A, the mean over i of a function g (i) is:

$$\text{mean}_{i \in A}[g_i] = \frac{1}{\#A} \sum_{i=1}^{\#A} g_i.$$

The vector of proportion $\pi^U \equiv \{\pi_1^U, \ldots, \pi_c^U\}$ representing the quantities of interest forms a simplex—i.e., $\pi_c^U \in [0,1]$ for all c, and $\Sigma_{c=1}^C \pi_c^U = 1$. The analogous (but observed) category proportions for the labeled set $\pi^L$ can be similarly defined.

Figure 3:
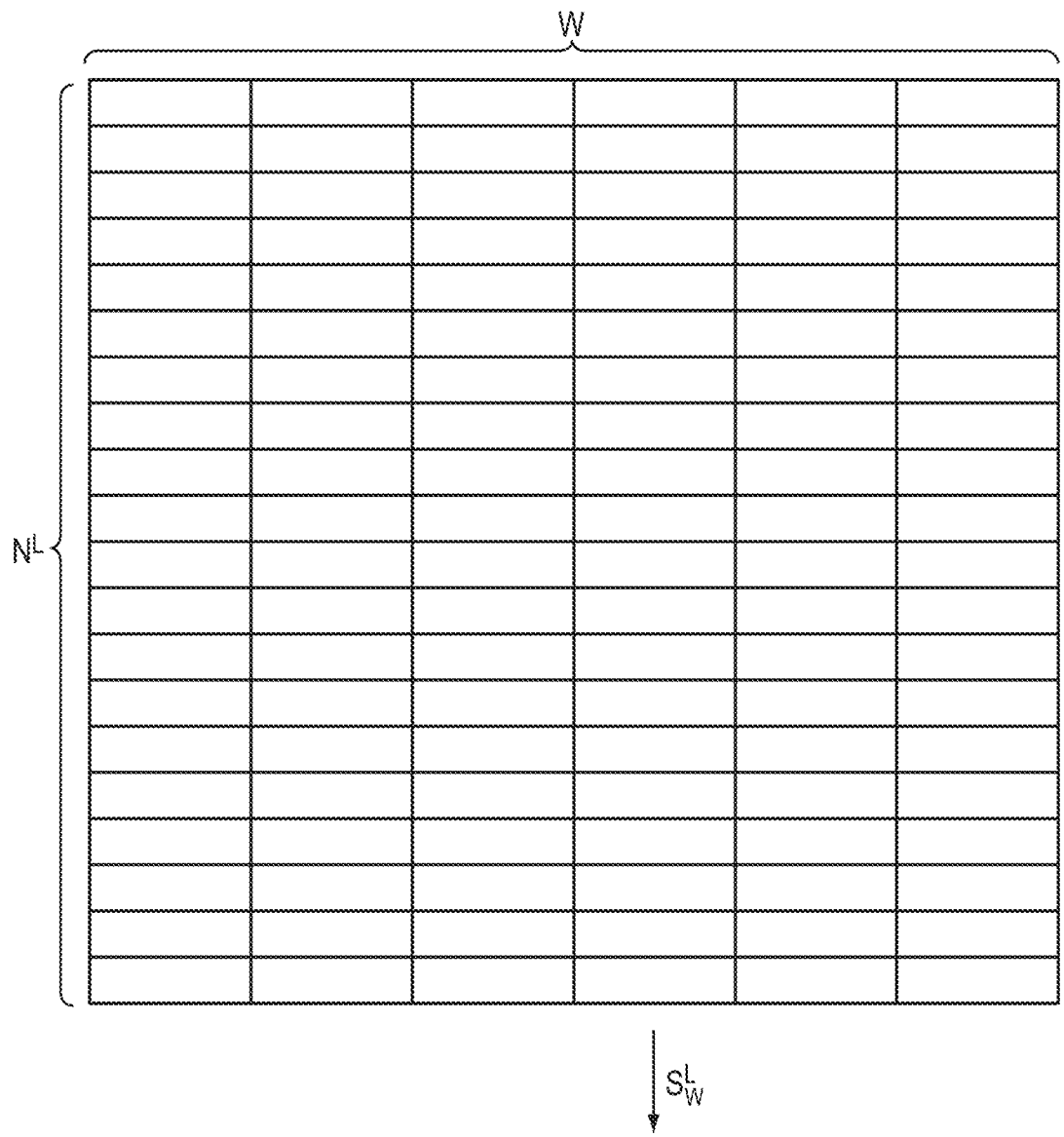
FIG. 3 depicts an exemplary document-feature matrix F in accordance with various embodiments.

Referring again to FIG. 1, in various embodiments, step 102 includes a conventional procedure that maps the entire textual documents in the labeled and unlabeled sets into a numerical feature space such that the natural language in the documents is represented as numerical variables (this step is referred to herein as the "text-to-numbers step"). The mapping procedure may be designed to optimize quantification of the documents as further described below. In some embodiments, estimation of the document quantification is simplified to consider only dichotomous stemmed unigram indicator variables (i.e., the presence or absence of each of a list of word stems). For a set of k unigrams in a document, the number of possible strings of these zeros and ones (or "a word stem profile, W,") may be given by: $W=2^k$. A W-length feature vector, $S^L$, may then be computed by sorting the labeled documents into the W mutually exclusive and exhaustive word stem profiles and computing the proportion of documents that fall into each profile. Referring to FIG. 3, to make the definition of $S^L = \{S_w^L\}$ more precise and easier to generalize later, an $N^L \times W$ document-feature matrix $F = \{F_{iw}\}$ may be created with rows for documents and columns for features, which are the unique word-stem profiles in the present invention. Each element of this matrix, $F_{iw}$, is a binary indicator (0 or 1) for whether the document i is characterized by a word stem profile w. Then elements of $S^L$ can be computed by the column means of F: $S_w^L = \text{mean}_{i \in L}(F_{iw})$. The feature vector of the unlabeled set, $S^U$, may also be determined using the same procedure with the same word-stem profiles.

In addition, a W-length conditional feature vector of the labeled set, $X_c^L$, may be defined as: $X_c^L = \{X_{wc}^L\}$; similarly, a conditional feature vector of the unlabeled set, $X_c^U$, may be defined as: $X_c^U = \{X_{wc}^U\}$ (note that $X_c^U$ is unobserved because c is unknown in the unlabeled set). The conditional feature vectors, $X_c^L$ and $X_c^U$, may be computed from $F^c$, a document-feature matrix representing documents in category c only utilizing the same procedure applied to obtain $S^L$ within the category c described above. The conditional feature vectors for all categories may then be collected into two W×C matrices: $X^L = \{X_1^L, \ldots, X_c^L\}$ and $X^U = \{X_1^U, \ldots, X_c^U\}$ for the labeled and unlabeled sets, respectively.

To estimate the vector of the category proportion in the unlabeled set—i.e., $\pi^U = \{\pi_1^U, \ldots \pi_c^U\}$—using $S^L$, $S^U$, and $X^L$, in various embodiments, an accounting identity (i.e., true by definition) may be implemented. The accounting identity is given by:

$$S_w^U = \Sigma_{c=1}^C X_{wc}^U \pi_c^U, \forall w \quad \text{Eq. (1)}$$

(or equivalently in a matrix form: $S^U = X^U \pi^U$).

Eq. (1) may then be solved for the quantity of interest as in a linear regression: $\pi^U = (X^{U'}X^U)^{-1}X^{U'}S^U$. But because the "regressor" $X^U$ is unobserved, $\pi^U$ may not be directly computed this way. In various embodiments, $\pi^U$ is estimated by replacing $X^{U'}$ and $X^U$ with $X^{L'}$, and $X^L$, respectively. The estimated $\widehat{\pi^U}$ can then be computed by:

$$\widehat{\pi^U} = (X^{L'}X^L)^{-1}X^{L'}S^U \quad \text{Eq. (2)}$$

(or any modified version of this expression so long as it explicitly preserves the simplex constraint). Accordingly, the nonparametric approach described herein may provide estimations of the category proportion of the unlabeled set without classifying each document therein.

In some embodiments, instead of making the rigid assumption that $X^U = X^L$, the labeled conditional feature matrix may be expressed as an unbiased and consistent estimator of the unlabeled conditional feature matrix:

$$E(X^L) = X^U, \lim_{N^L \to \infty} X^L = X^U \quad \text{Eq. (3)}$$

This assumption, however, may be violated when there is a concept drift—e.g., if the labeled set is coded at one time, and the unlabeled set is collected at another time or in another place where the meanings of certain terms differ from those in the labeled set. Concept drift may be overcome using a matching approach as further described below.

The assumption of Eq. (3) about the conditional distribution of features and categories is considerably weaker than the assumptions made by conventional classifiers, which include: (i) the joint distribution of the features and categories is the same in the labeled and unlabeled sets, (ii) the measured features span the space of all predictors of D, and (iii) the estimated model nests the true model as a special case. Because the correct model linking the features to the categories is unknown ex ante, these assumptions in conventional classifiers are generally difficult to satisfy. On the contrary, because the relationship between the unconditional and conditional feature vectors herein follows directly from the laws of probability applied in Eq. (1), the approach described in various embodiments has no need to assume a model for S. Accordingly, the assumption of Eq. (3) is easy to satisfy and the nonparametric estimation approach described herein is model-independent.

In addition, to ensure that $\bar{\pi}^U$ is uniquely defined, the matrix $X^L$ must be assumed to be of full rank, which translates into: (i) feature choices that lead to W>C, and (ii) the lack of perfect collinearity among the columns of $X^L$. Assumption (i) may be easy to control by generating a sufficient number of features from the text. Assumption (ii) may be violated if the feature distributions in documents across different categories are identical (which is generally unlikely with a sufficient number of coded documents).

Estimation Performance

A. Analytical Results

In the classic errors-in-variables linear regression model, with random measurement errors in the explanatory variables, the least-square approach is biased and inconsistent. Under the above assumptions, nonparametric estimation as described herein may also include linear regression with random measurement errors in the explanatory variables. But because nonparametric estimation as described herein is carried out in the converted feature space (as opposed to the original observation space), the estimations may be statistically consistent: as more documents for the labeled set are collected and coded (while keeping W fixed, or at least growing more slowly than n), the estimator described herein converges to the truth:

$$\lim_{N^L \to \infty} \bar{\pi}^U = \lim_{N^L \to \infty} (X^{L'} X^L)^{-1} X^{L'} S^U = (X^{U'} X^U)^{-1} X^{U'} S^U = \pi^U. \quad \text{Eq. (4)}$$

This indicates that, unlike a classic errors-in-variables linear regression model, collecting more data using nonparametric estimation as described herein may reduce the estimation bias and variance. It also indicates that a finite sample bias (rather than consistency results) may be focused on in order to improve the estimation results.

To analyze the bias, a simplified case having only two categories is considered. Because of the simplex constraint, the unlabeled set category proportions may be characterized by a single parameter, $\pi_1^U$, and the accounting identity for each feature mean w, $S_w^U$, may be written simply as:

$$S_w^U = X_{w2}^U + (X_{w1}^U - X_{w2}^U)\pi_1^U \quad \text{Eq. (5)}$$

The estimator in various embodiments is then the least-square estimator of $\pi_1^U$, and can be written as follows based on four propositions.

Proposition 1: two-category estimator in the nonparametric approach herein is:

$$\bar{\pi}_1^U = \frac{\sum_{w=1}^{W}(X_{w1}^L - X_{w2}^L)(S_w^U - X_{w2}^L)}{\sum_{w=1}^{W}(X_{w1}^L - X_{w2}^L)^2}. \quad \text{Eq. (6)}$$

If $X^L = X^U$, the above expression equals $\pi_1^U$. However, due to the sampling error, the realized sample value of $X^L$ may differ from the unobserved true value $X^U$. By the assumption of Eq. (3), $X_{wc}^L$ satisfies: $X_{wc}^L = X_{wc}^U + \epsilon_{wc}$, where $\epsilon_{wc}$ is a random variable with the mean zero and variance inversely proportional to $N_c$. This enables us to write the estimator in the nonparametric estimation approach in terms of $X^U$, the true unlabeled set category proportion $\pi_1^U$, and the sample category size $N_c^L$. Taking the expectation of this quantity yields:

Proposition 2: the expected value of the two-category estimator is:

$$\mathbb{E}[\bar{\pi}_1^U] = E\left[\frac{\sum_{w=1}^{W}(X_{w1}^L - X_{w2}^U + \epsilon_{w1} - \epsilon_{w2})(X_{w1}^U - X_{w2}^U)}{\sum_{w=1}^{W}(X_{w1}^U - X_{w2}^U + \epsilon_{w1} - \epsilon_{w2})^2}\right]\pi_1^U - \quad \text{Eq. (7)}$$

$$E\left[\frac{\sum_{w=1}^{W}(X_{w1}^U - X_{w2}^U + \epsilon_{w1} - \epsilon_{w2})(\epsilon_{w2})}{\sum_{w=1}^{W}(X_{w1}^U - X_{w2}^U + \epsilon_{w1} - \epsilon_{w2})^2}\right].$$

The consistency property of nonparametric estimation can be seen here: as the error in measuring $X^U$ with $X^L$ goes to zero or $N^L$ goes to infinity, the second term in the expectation is 0 (because $\epsilon_{w2} \propto 1/N_c^L \to 0$), while the first term converges to $\pi_1^U$. In the presence of measurement errors, the bias is a function of the difference in the true category proportions, $X_{w1}^U - X_{w2}^U$, and the combined error variance $\text{Var}(\epsilon_{w1} - \epsilon_{w2})$—both of which are components of the lack of textual discrimination. Further intuition can be obtained by an approximation using a first-order Taylor polynomial:

Proposition 3: the approximate bias of the estimator is:

$$\text{Bias}(\bar{\pi}_1^U) \approx \frac{\sum_{w=1}^{W}\{\text{Var}(\epsilon_{w2}) - \text{Cov}(\epsilon_{w1}, \epsilon_{w2})\}(1 - \pi_1^U) -}{\sum_{w=1}^{W}(X_{w1}^U - X_{w2}^U)^2 + \text{Var}(\epsilon_{w1}) + \text{Var}(\epsilon_{w2}) -} \quad \text{Eq. (8)}$$

$$\frac{(\text{Var}(\epsilon_{w1}) - \text{Cov}(\epsilon_{w1}, \epsilon_{w2}))\pi_1^U}{2\text{Cov}(\epsilon_{w1}, \epsilon_{w2})}.$$

This expression suggests four insights: first, as the textual discrimination $(X_{w1}^U - X_{w2}^U)^2$ increases relative to the variance of the error terms, the bias approaches 0. In other words, nonparametric estimation works better when the language of the documents across categories is distinct. Because the numerical summaries of the text clearly differ across categories, their observed values are not obscured by measurement error. Second, adding more informative numerical representations of the text to increase W (but with a fixed n) has an indeterminate impact on the bias. While more informative numerical summaries of the text can increase the sum in the denominator, they may increase the overall bias if the error variance is high relative to the discriminatory power. In other words, when the discriminatory power of the numerical summaries of the text is low, the bias generated by nonparametric estimation as described herein is dominated by the relationship between the error variances. Third, since the elements of $X^L$ are simple means across documents assumed to be independent, the variance of the measurement error terms is simply $\text{Var}(\epsilon_{wc}) = \sigma_{wc}^2 / N_c^L$, which declines as the labeled set category sizes increase. Finally, by assuming independence of the measurement errors across categories (i.e., $\text{Cov}(\epsilon_{w1}, \epsilon_{w2}) = 0$), the bias in the nonparametric estimation is minimized when the following relationship holds between the labeled and unlabeled set category proportions:

Proposition 4. when measurement errors are independent across categories, the bias of the nonparametric estimation is minimized at:

$$\pi_1^L = \frac{\pi_1^U \sum_{w=1}^{W} \sigma_{w1}^2}{\pi_1^U \sum_{w=1}^{W} \sigma_{w1}^2 + (1-\pi_1^U) \sum_{w=1}^{W} \sigma_{w2}^2} \qquad \text{Eq. (9)}$$

Thus, when measurement error variances are roughly equivalent across categories, the bias of the nonparametric estimation is smallest when the category proportion divergence is smallest between the labeled and unlabeled sets.

B. Simulation Results

Simulations with large values of C and W may yield complexity without much additional insight, so for expository purposes, C and W can be set as follows: C=2 and W=2. The three factors that affect the performance of nonparametric estimation as described herein can be varied. These are the degree of concept drift (i.e., how the meaning of the text changes between the labeled and unlabeled sets), textual discrimination (i.e., how distinct the language in different categories is), and proportion divergence (i.e., differences between $\pi^U$ and $\pi^L$). Also, textual discrimination can be divided into two separate measures, category discrimination and feature discrimination; both are determined based on the differences between categories: $b_w = X_{wc} - X_{wc'}$ for row w=1, 2. Category discrimination is the average sum: $(b_1+b_2)/2$ and feature discrimination is the average difference: $(b_1-b_2)/2$ (or all possible sums and differences for larger numbers of rows or columns).

Figure 4A:
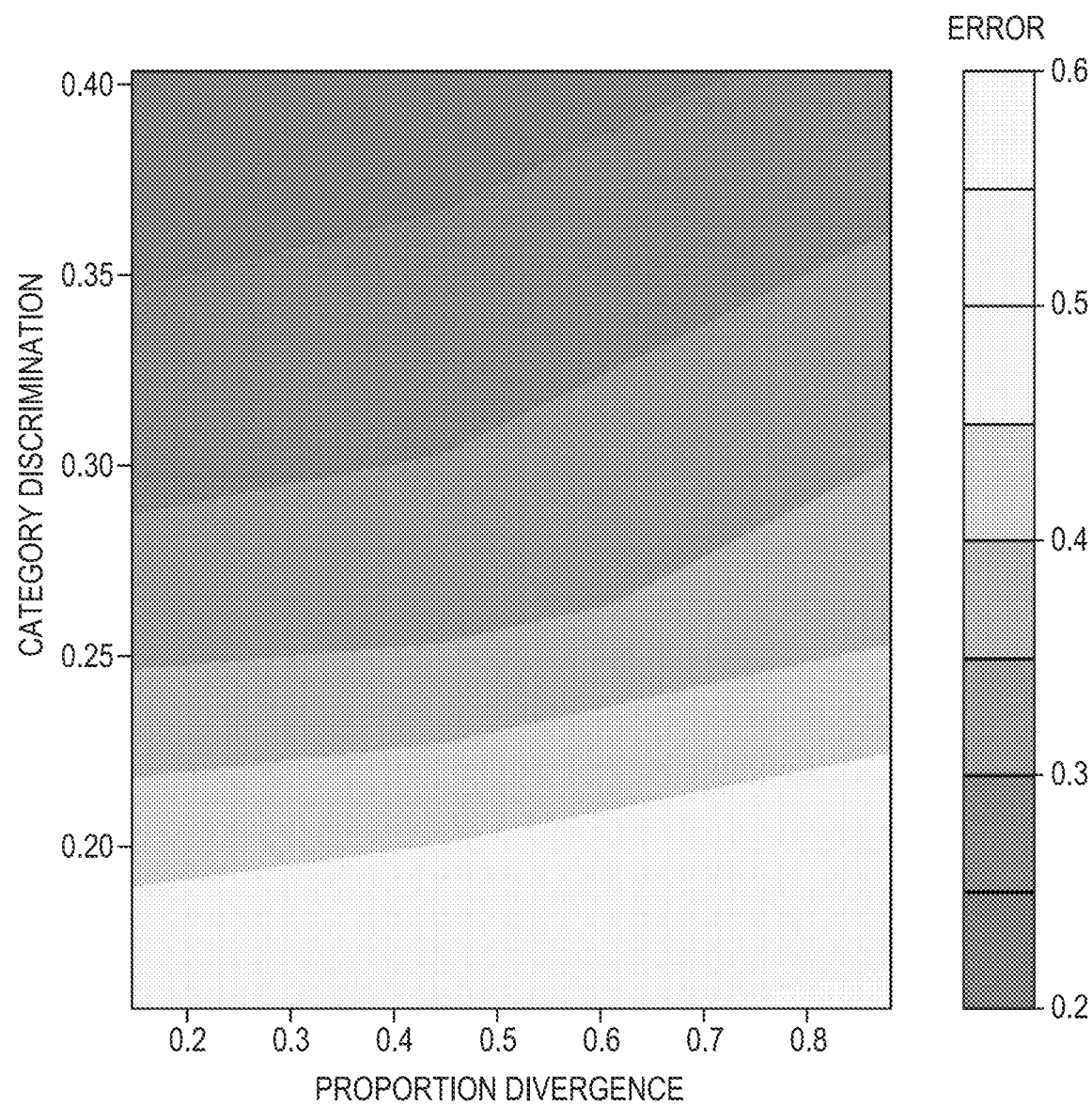
FIGS. 4A-4C illustrates the dependence of mean-square errors on the proportion divergence and category discrimination in accordance with various embodiments.

Variations in these factors can be created as follows. First, proportion divergence can be controlled by drawing $\pi^U$ and $\pi^L$ from independent and identically distributed (IID) Dirichlet distributions with concentration parameters set to 2. (As illustrated in FIGS. 4A and 4C, average proportion divergence can be measured as: $(|\pi_1^L - \pi_1^U| + |\pi_2^L - \pi_2^U|)/2$.) $X_{wc}^U$ can be sampled from an IID Normal distribution with the mean of 0 and variance of 1/9. Then, $X_{wc}^L = X_{wc}^U + \epsilon$ can be generated, where $\epsilon = 0$ or, to simulate the concept drift, from a Normal distribution with a mean of 0 and a standard deviation equal to $(0.5 \cdot |X_{wc}^U|)$. These parameters can be treated as fixed and, to simulate the measurement error in the calculation of $X^L$, 5,000 repeated sample data sets can be generated from each set of parameters, the nonparametric estimator can be applied, and the mean squared error (MSE) can be estimated. To generate each of the 5,000 sampled data sets, document-level features can be randomly generated from Normal densities by adding a draw from a standard Normal to each cell value of $X_{wc}^L$ and $X_{wc}^U$.

FIG. 4A illustrates how the MSE behaves as a function of category discrimination (vertically) and proportion divergence (horizontally). MSE is coded as illustrated from low (black) to high (white). Performance of the nonparametric estimation approach is the best at the top left—i.e., where the proportion divergence is low and category discrimination is high. When the language is clearly distinguishable between different categories, the estimation approach can overcome even very large divergences between the labeled and unlabeled sets. Without the good textual discrimination, the estimation approach can become vulnerable to high levels of proportion divergence. Category discrimination and proportion divergence appear to have roughly the same relative importance, as the contour lines in FIG. 4A fall at approximately 45° angles.

Figure 4B:
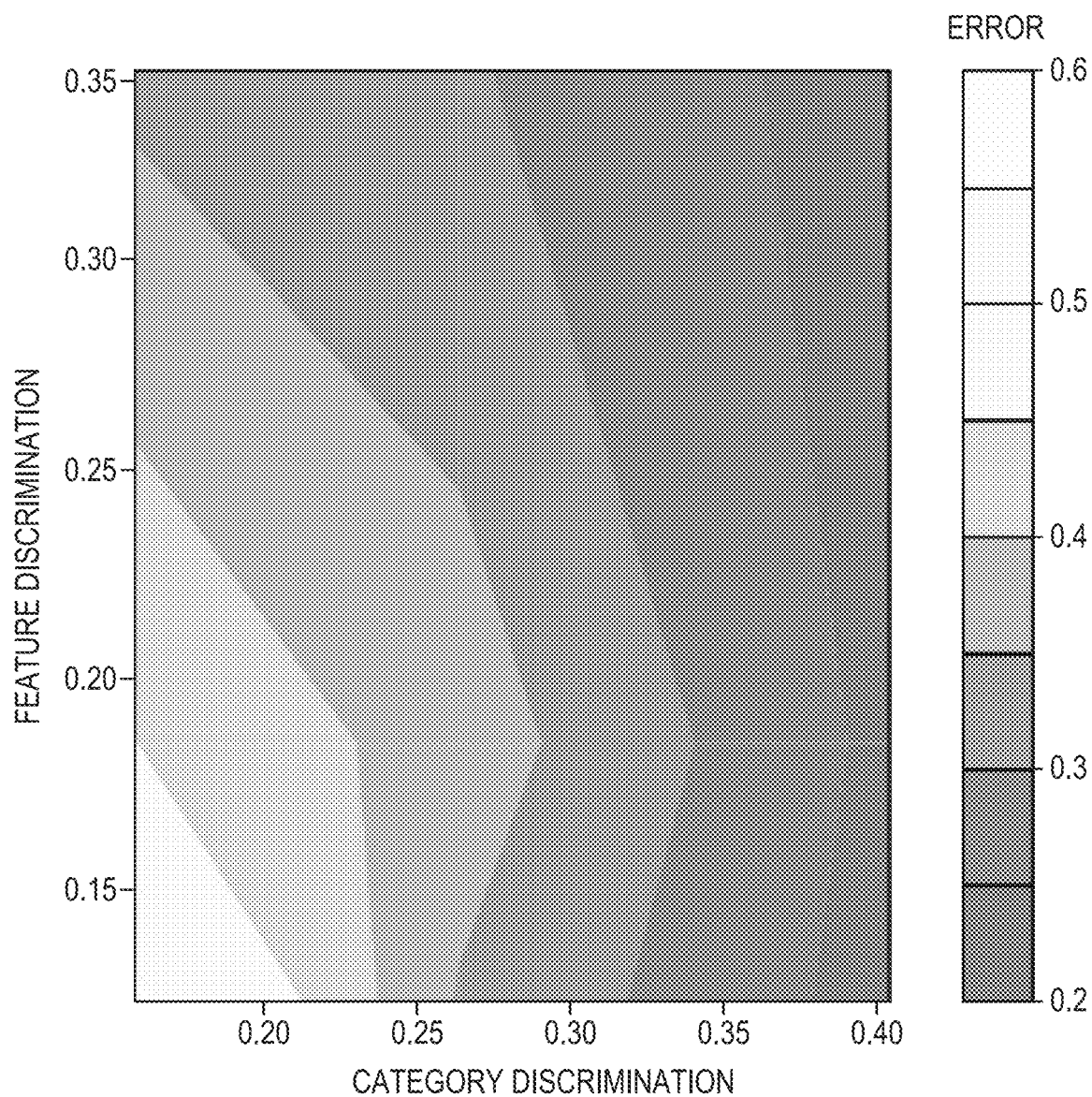
Figure 4C:
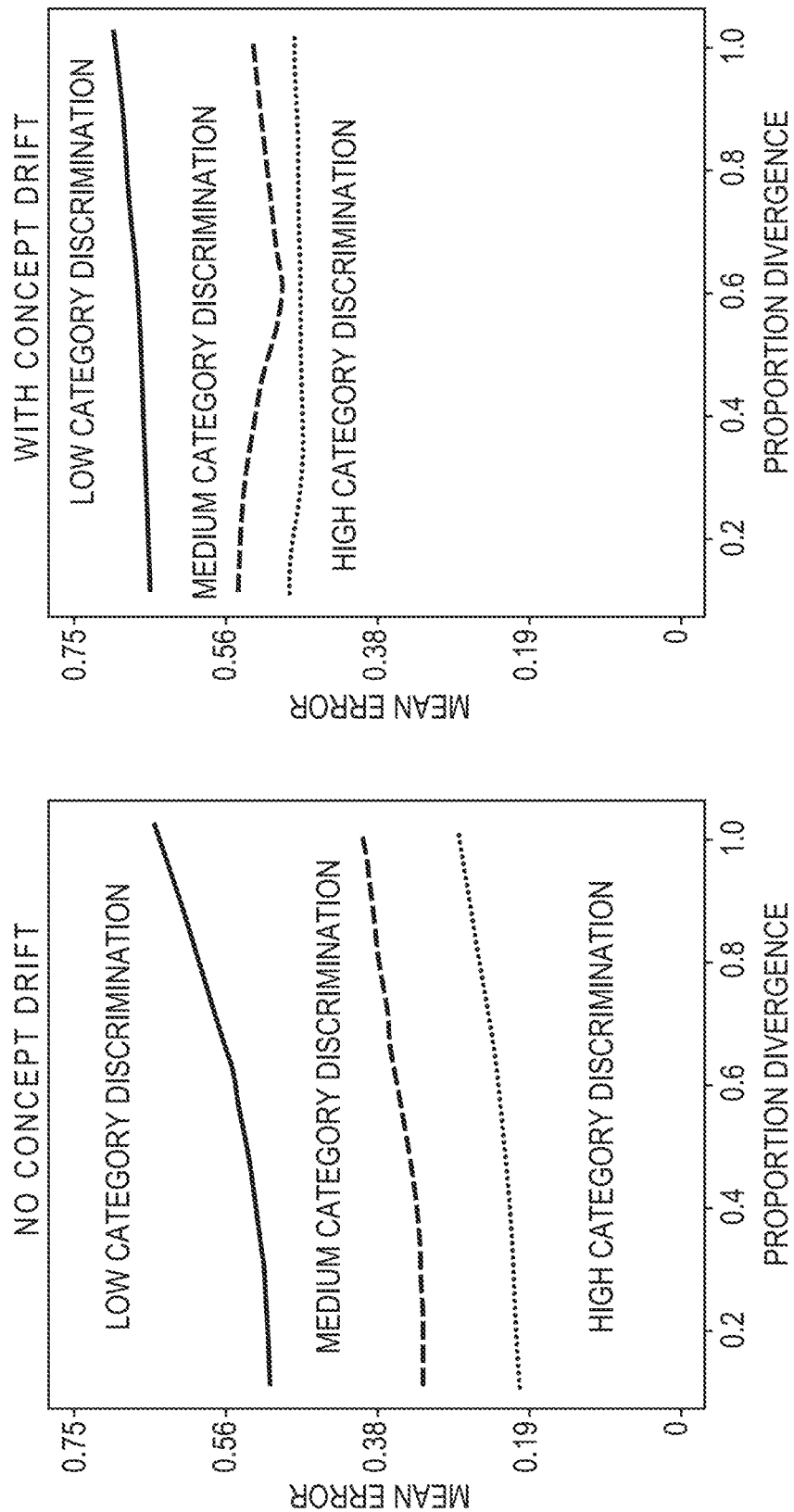

FIG. 4B illustrates how the category discrimination (horizontally) and feature discrimination (vertically) jointly impact the MSE. If the feature discrimination is held fixed, increasing the category discrimination may improve the estimation performance; if the category discrimination is held fixed, a greater feature discrimination may similarly lead to better performance. Of these two factors, the feature discrimination is more predictive of the performance, but both factors may be important.

Finally, FIG. 4C illustrates how the relationship between the feature discrimination (three separate lines in each panel) and the proportion divergence (horizontal axis) is mediated by the presence of the concept drift (difference between the panels). Without the concept drift (left panel), highly discriminatory features greatly reduce the MSE (which can be seen by the wide separation among the lines). In contrast, in the presence of the concept drift (in this case, the mean of $E(X^L)$ can be moved by a quarter of a standard deviation from $X^U$), more discriminatory features still tend to outperform less discriminatory features; but the difference is less pronounced. With the concept drift, features which are discriminatory in the labeled set may no longer be discriminatory in the unlabeled set.

Improvements of the Nonparametric Approach

In accordance with the analysis and simulation described above, performance of the nonparametric estimation may be degraded in the presence of a concept drift, a lack of textual discriminations, and a proportion divergence. Again, concept drift occurs when the meaning of words change between the labeled and unlabeled sets. For example, obvious inferential problems for any text analytic method may occur if "Watergate" refers to a hotel in the labeled set but a scandal in the unlabeled set. In various embodiments, matching may be applied to address this problem, thereby improving the estimations as further described below.

Lack of textual discrimination occurs when the language used in the documents falling in different categories is not clearly distinguishable. This problem may arise because the conceptual ideas underlying the chosen categories are not distinct. Coding errors may also lead to this problem. Further, this problem may occur due to heterogeneity in how authors express category-related information or a divergence between how authors of the documents express this information and how the analyst conceptualizes the categories. In some situations, even if the analyst begins with distinct and well-defined conceptual definitions for the set of C categories and has examples of documents that fall unambiguously into each one category, large numbers of individual documents may have text that describe concepts in multiple categories. Adding categories to represent these more complicated expressions (so that the resulting set is still mutually exclusive and exhaustive) is a logical solution to this problem, but this step often leads to a more cognitively demanding coding problem that often results in even lower levels of inter-coder reliability. This problem may be addressed using feature extraction as further described below.

Finally, proportion divergence interacts with the other two problems, meaning that the category proportions in the labeled set $\pi^L$ diverge from those in the unlabeled set $\pi^U$. Consider a data set having a massive concept drift, no textual discriminations (thus the document text is uninformative) but satisfying $E(\pi^L)=\pi^U$ (this may occur when the labeled set is a random sample from the received data), the nonparametric estimation approach described herein may accurately return the observed proportions in the labeled set, $\pi^L$, which is an unbiased estimate of $\pi^U$. In some embodiments, the labeled set is selectively pruned to improve the estimations as further described below.

A. Feature-Extraction Approaches

Figure 5:
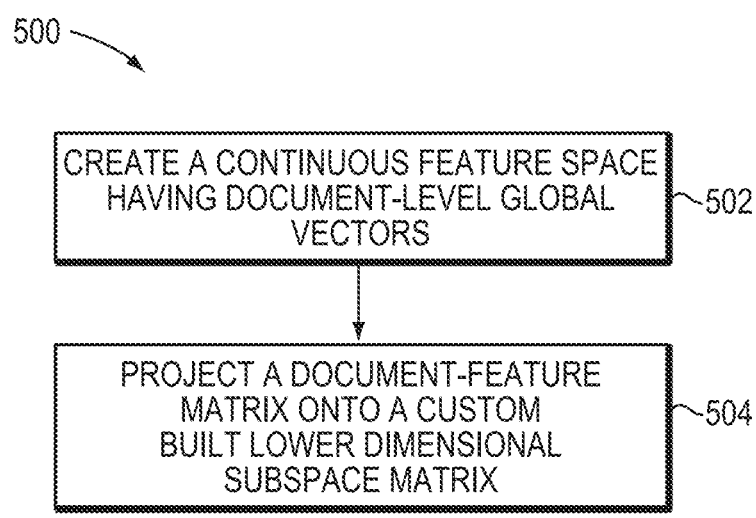
FIG. 5 is a flowchart of an exemplary feature-extraction approach in accordance with various embodiments.

Referring to FIG. 5, in various embodiments, a feature-extraction method 500 is applied to improve textual discrimination and, as a result, the estimation results. The feature-extraction method 500 may include optimizing the text-to-numbers step 102 described above for direct estimation of the category proportions. In one implementation, the discrete feature space created in step 102 is first replaced with a reduced, continuous feature space having document-level "global vectors" (step 502). The reduced feature space may be established using a global log-bilinear regression model as described in "Glove: Global vectors for word representation," *Proceedings of the* 2014 *conference on empirical methods in natural language processing* (EMNLP), pp. 1532-1543, the entire disclosure of which is hereby incorporated by reference. In one embodiment, the reduced feature space includes 50 vector dimensions; statistical values (e.g., the minimum, maximum, and/or mean values) of the vectors in the reduced feature space can then be computed. The text-to-numbers summary in the reduced feature space may produce a more informative F matrix.

In a second step 504, the n×W document-feature matrix F may be projected onto a custom built n×W' (where W'<<W) lower dimensional subspace matrix F̲. In one embodiment, this is done using a linear projection, F̲=F·Γ (where Γ=W× W'). Alternatively, a nonlinear projection or a random projection may be utilized. For notational simplicity, definition of the conditional feature vector, X, remains the same, but the features that populate the rows of this matrix are now taken from the matrix F̲, instead of F. It should be noted that a "Tied-Hand Principle (THP)" is followed here. We denote A and B as two data objects, Z as exogenous information, and m* as a mapping that transforms the original inputs by matching or weighting object subsets, transforming the object features, or selecting object features for use in an analysis comparing m(A) and m(B). THP states that m* can be of the form:

$m^*=\arg\max_m f(m,A,Z)$, or $m^*=\arg\max_m f(m,B,Z)$, but not $m^*=\arg\max_m f(m,A,B,Z)$.

Thus, it is prohibited to find Γ* by minimizing f(Γ,Z,L,U). In addition, a special case of the THP is also invoked in causal inference, where the matching of treated and control observations is performed without taking into account the response—i.e., the observation weights are calculated explicitly without taking into account the outcome in the alternative treatment class. A special case in the context of case control designs is that selecting observations on the outcome, $Y_i$, is permitted provided that the users do not select on X also.

The THP principle is indeed followed in the feature-extraction approach, the projection matrix, Γ, can then be optimized to maximize both category discrimination and feature discrimination in the labeled set. These criteria are defined in their general form as:

Category Discrimination $\propto \Sigma_{c<c'} \Sigma_{w=1}^W |X_{wc}^L - X_{wc'}^L|$, and Feature Discrimination $\propto \Sigma_{c<c'} \Sigma_{w'<w} ||X-X_{wc'}| - |X_{w'c} - X_{w'c'}||$, where c and c' are two different categories in the set of categories C. In some embodiments, the projection matrix Γ is chosen to maximize the equally weighted sum of the category discrimination and feature discrimination metrics. In one embodiment, the Hooke-Jeeves algorithm is utilized for the optimization. In addition, the columns of S is normalized as a form of regularization to keep Γ a computationally manageable size.

Figure 6A:
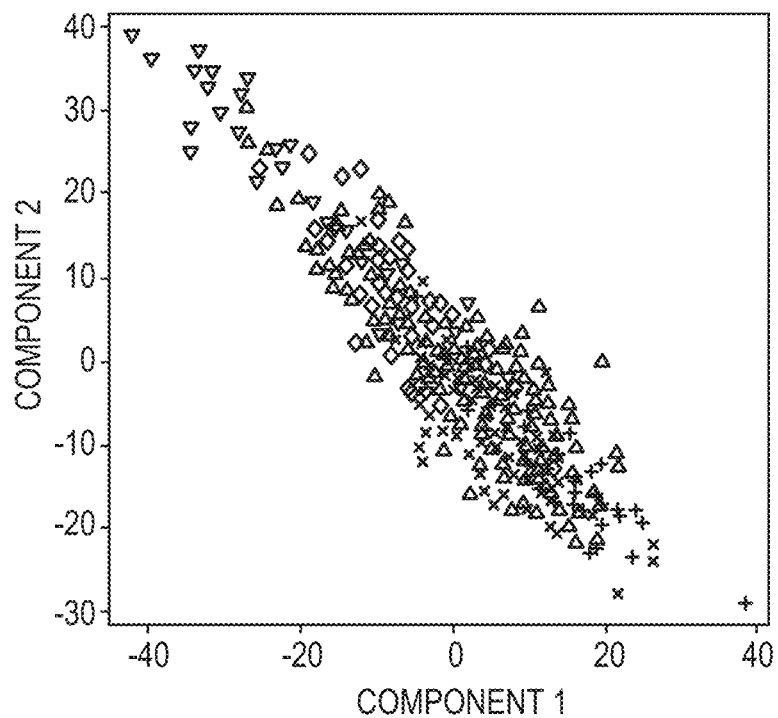
FIG. 6A depicts projections of a document-feature matrix when its projection matrix is optimized by maximizing the category discrimination only in accordance with various embodiments.
Figure 6B:
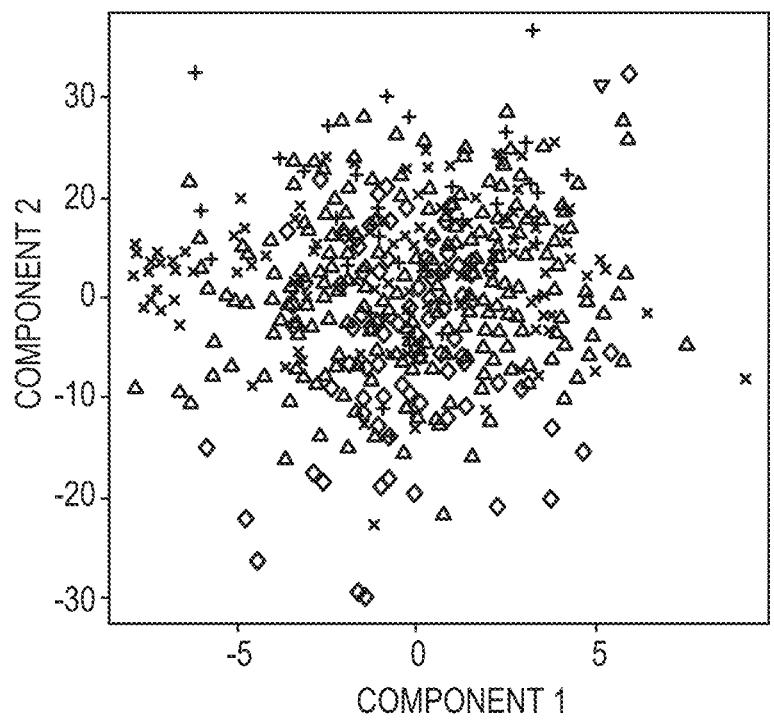
FIG. 6B depicts projections of a document-feature matrix when its projection matrix is optimized by maximizing the feature discrimination only in accordance with various embodiments.

It should be noted that optimizing projection matrix Γ to satisfy both criteria simultaneously is crucial, as optimizing Γ for the category discrimination alone may lead to a high variance by allowing collinearity in X, and optimizing Γ for the feature discrimination alone may lead to a high bias by lacking category discrimination. Optimizing both discriminations together may reduce mean-square errors overall. This point may be illustrated using an analysis of data comprised of 1,426 emails drawn from the broader Enron Corporation email corpus made public during the Federal Energy Regulatory Commission's investigation into the firm's bankruptcy. These emails are first coded into five broad topics: company business, personal communications, logistics arrangements, employment arrangements, and document editing. For expository simplicity, W' is set as 2 and Γ is chosen by maximizing the category discrimination metric alone (i.e., selecting projections that create maximal contrasts in pairwise columns of $X^L$). FIG. 6A depicts a scatterplot of the resulting projections of F̲, with different symbols to represent the five categories. FIG. 6A reveals that these features discriminate between the categories (which is seen by the separation between different symbols). But, as is also apparent, the two dimensions are highly correlated which, like in the linear regression analysis, may lead to higher variance estimates. In the linear regression, given a fixed sample size, collinearity is an immutable fact of the fixed data set. In contrast, the feature-extraction method 500 operates in the space of the features rather than the data; thus the projections, the space in which the regression is operating, and therefore the level of collinearity may be varied. FIG. 6B depicts another scatterplot of the resulting projections of F̲ when Γ is optimized by maximizing only the feature discrimination. In this case, the columns of $X^L$ are uncorrelated but unfortunately do not discriminate between categories well (as can be seen by the points with different symbols overlapping).

Figure 6C:
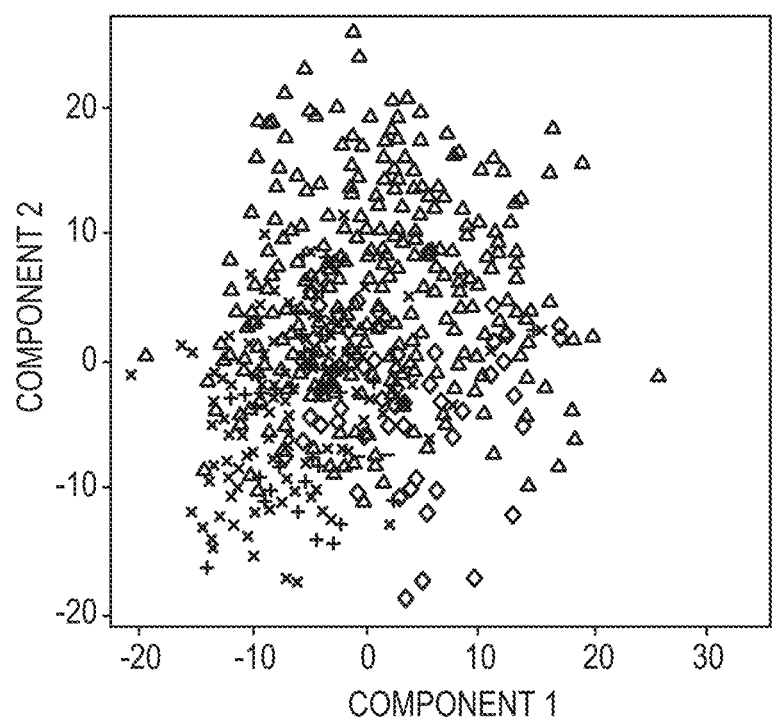
FIG. 6C depicts projections of a document-feature matrix when its projection matrix is optimized by maximizing the sum of both category discrimination and feature discrimination in accordance with various embodiments.

Finally, FIG. 6C depicts a scatterplot of the resulting projections of F̲ generated by optimizing the sum of both category and feature discrimination. As illustrated, this result is well calibrated for estimating category proportions: the dimensions are discriminatory (which is seen by the symbol separation) and thus bias reducing, but still uncorrelated and thus variance reducing. The category proportions in the unlabeled set, $\pi^U$, can then be estimated by applying the linear regression: $\pi^U = (X^{L'}X^L)^{-1}X^{L'}S^U$ as described above. In addition, the sum of the absolute residuals in estimating $\pi^U$ is improved from 0.55 to 0.30. Accordingly, the feature-extraction approach 500 may advantageously create a feature space that optimally discriminates between categories (i.e., maximizing the category discrimination) and contains as many non-redundant or independent features as possible (i.e., maximizing the feature discrimination).

B. Matching Approaches

In various embodiments, the document-feature matrix F (and thereby $X^L$) is adjusted such that the reliance on the assumption of Eq. (3) is reduced. Both concept drift and proportion divergence can be taken on by noting that if $X^U$ can be used in the estimator of the nonparametric approach, the linear regression yields $\pi^U$ exactly. Accordingly, the goal is to adjust F, and therefore $X^L$, for the purpose of reducing the distance between $X^U$ and $X^L$—i.e., $\|X^U - X^L\|$. In one implementation, this goal is achieved using a matching approach as further described below.

Generally, the concept drift and proportion divergence may occur for two separate reasons. First, the unlabeled set may contain neologisms (i.e., a token containing a string of characters not represented in the labeled set); no empirical method can address this problem directly. Fortunately, numerous other words and phrases also represented in the labeled set usually accompany neologisms and from which the inferences can be made. Second is the potentially differing empirical frequencies with which different words and patterns of words occur in the labeled and unlabeled sets; this issue can be addressed directly utilizing the approach described herein. In various embodiments, matching is employed to reduce these frequency discrepancies by reducing the model dependence in parametric causal inference. Matching is implemented to improve the "balance" between the labeled and unlabeled set—i.e., improving the degree to which the distributions of the labeled and unlabeled sets resemble each other. Matching may operate by constructing a matched set, $\mathcal{M}$, that substantially resembles the unlabeled set based on the labeled set. As used herein, the term "substantially" means that the degree to which the distributions of the labeled and unlabeled sets resemble each other is 90%, 80%, or 70%. As a result, the distance between $X^U$ and $X^L$ (i.e., $\|X^U - X^L\|$), the concept drift, and the proportion divergence may be all reduced; consequently, the bias in estimating $\pi^U$ may be reduced.

Figure 7:
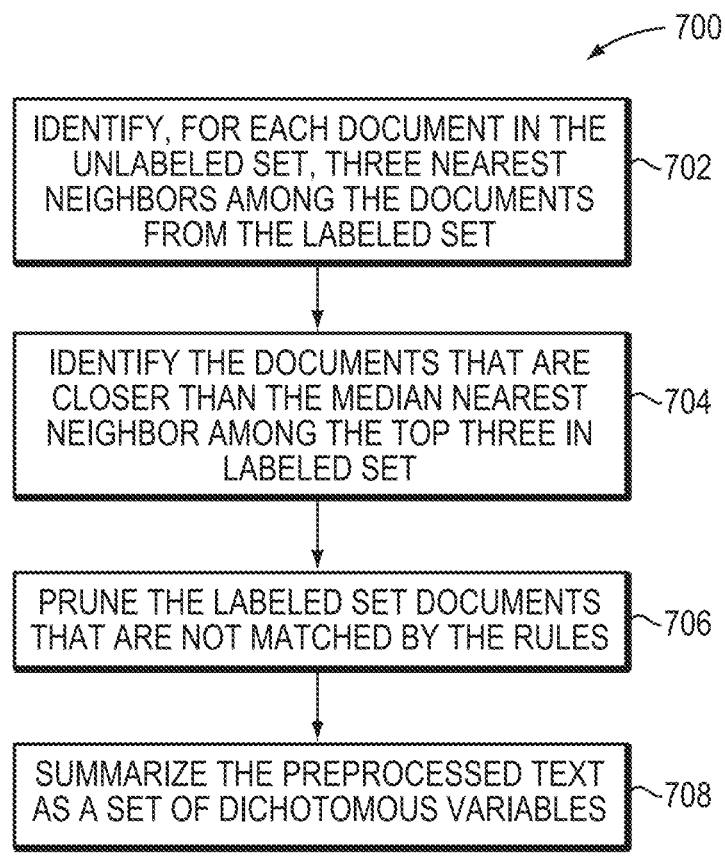
FIG. 7 is a flowchart of an exemplary matching approach in accordance with various embodiments.

FIG. 7 depicts a flowchart of an exemplary matching method 700. In various embodiments, the unlabeled set is fixed such that the quantity of interest, $\pi^U$, is not changed. Then, for each document in the unlabeled set, three nearest neighbors, defined in the Euclidean space, among the documents from the labeled set are identified (step 702). In addition, any documents that are closer than the median nearest neighbor among the three nearest neighbors of all unlabeled documents in labeled set are captured (step 704). In a step 706, any labeled set documents that are not matched by these rules are pruned out and not used. This act of pruning is what makes the matching approach work in causal inference and, as applied here, reduces the concept drift and proportion divergence. The matched $X^L$ (denoted as $X^{L_\mathcal{M}}$) can then be computed, and, subsequently, the linear regression described above may be apply to estimate $\pi^U$.

Details of the matching approach are described "Matching as Nonparametric Preprocessing for Reducing Model Dependence in Parametric Causal Inference," *Political Analysis*, vol. 15, pp. 199-236 and "Causal Inference without Balance Checking: Coarsened Exact Matching," *Political Analysis*, vol. 20, pp. 1-24, the entire disclosures of which are hereby incorporated by reference.

It should be noted that the pruning to the matched set change means that there is now no need to satisfy the assumption of Eq. (3); instead, only a substantially weaker assumption below needs to be satisfied.

$$E(X^{L_\mathcal{M}}) = X^U, \lim_{N^L \to \infty} X^{L_\mathcal{M}} = X^U. \qquad \text{Eq. (10)}$$

As illustrated below, empirically, the matching method 700 achieves the desired goal: in the 72 real-world data sets, matching reduces the divergence between $X^L$ and $X^U$ in 99.6% of the cases and on average by 19.8%. Proportion divergence, which is not observed in real applications but can be measured because unlabeled sets are coded for evaluation, has reduced in 83.2% of the cases, and by on average 25%.

Estimation Results Utilizing the Improvement Approaches

An extensive empirical evaluation of the nonparametric estimation approach improved using the feature-extraction and matching approaches was performed on 7,200 data sets; each data set has a labeled out-of-sample test set that serves as the unlabeled set, except that its labels may be utilized after estimation to evaluate the performance. The 7,200 data sets are subsets of 72 separate corpora, created as described below. Herein, the "unimproved" approach and "improved" approach refer to nonparametric estimations that are unimproved and improved, respectively, using feature extraction and/or matching. The unimproved and improved approaches may include various steps described above.

The 72 corpora included the Enron email data set above, a set of 462 newspaper editorials about immigration (with 3,618 word stems and 5 categories), and a set of 1,938 blog posts about candidate Hillary Clinton from the 2008 presidential election (with 3,623 word stems and 7 categories). In addition, the 72 corpora included 69 separate Twitter data sets, each created by a different political candidate, private company, nonprofit, or government agency for their own business purposes, covering different time frames and categories; these data cover 150-4,200 word stems, 3-12 categories, and 700-4,000 tweets. All documents in each of the 72 corpora were labeled with a time stamp. A time point can be randomly selected and the previous 300 documents can be picked as the labeled set and the next 300 documents can be picked as the out-of-sample evaluation set (wrapping in time if necessary). For each corpus, this process can be repeated 100 times; as a result, 7,200 data sets in total can be provided. This procedure keeps the evaluation highly realistic, while also ensuring many types of proportion divergence, textual discrimination, and concept drift.

Figure 8A:
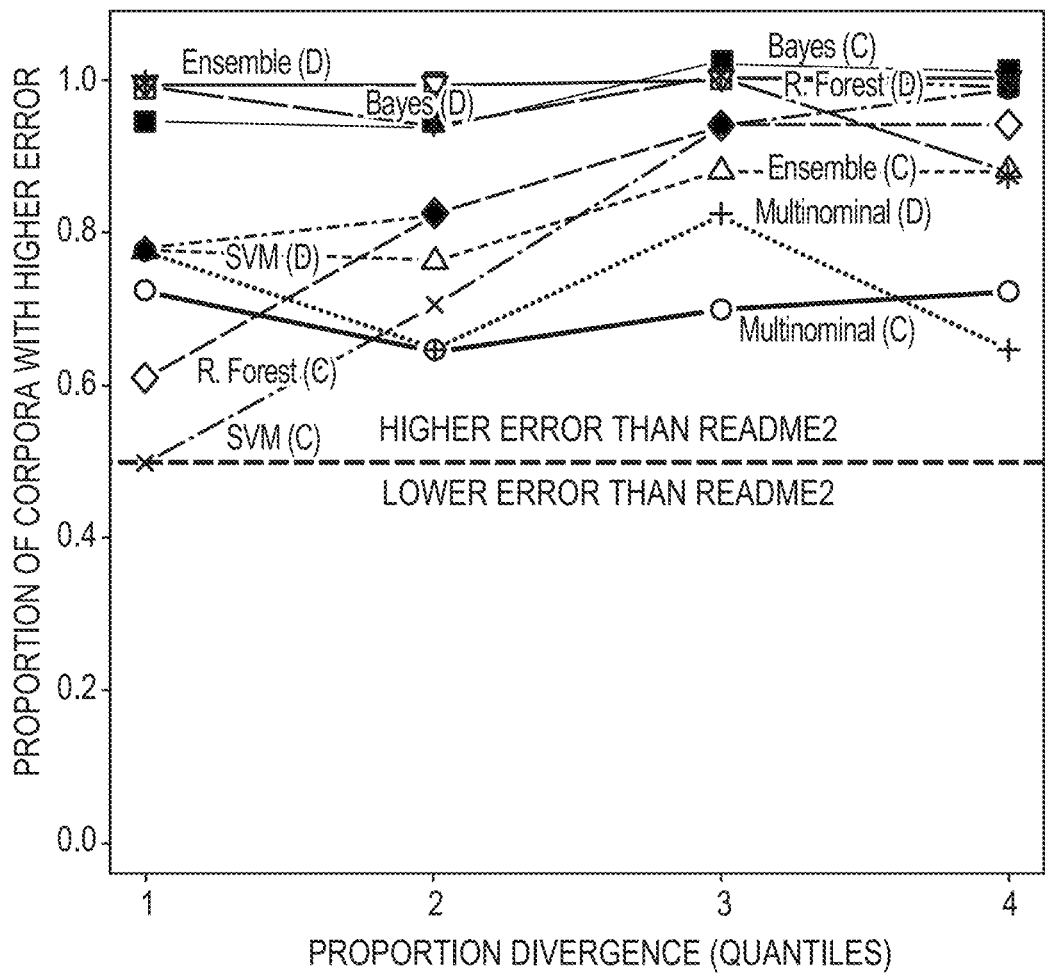
FIG. 8A depicts a comparison of estimation errors in document quantifications using various estimation approaches.

First, the improved estimation approach was compared to ten different count-and-classify methods—with five classifiers support vector machines, random forest, regularized multinomial regression, naive Bayes, and an ensemble method—each in the discrete space and continuous feature space. A detailed comparison with the unimproved estimation approach follows. (Both estimators were applied in the unimproved and improved estimation approach with 100 bootstrap iterations.) FIG. 8A depicts the results from the ten classify-and-count methods and the unimproved estimation approach. The proportion of data sets with higher errors than the improved estimation approach were computed vertically by the proportion divergence in quantiles horizontally. The improved estimation approach outperforms the best classifier (the regularized multinomial regression) in the continuous feature space in 67% of the data sets and the average classifier in the continuous space in more than 80% of the corpora. In addition, the improved estimation approach outperforms the best discrete classifier in over 70% of the corpora. Performance is good across different levels of the category proportion divergence between the labeled and unlabeled sets. The improved approach's relative performance improves further when the proportion divergence is high so there are substantial changes between the labeled and unlabeled sets (which makes sense since the estimation is the only approach that directly addresses concept drift). Compared to a baseline using the unimproved estimation approach, the improved approach achieved better performance on 96% of the sample corpora, with an average corpus-wise improvement of 34% (as depicted in FIG. 8B).

Figure 8B:
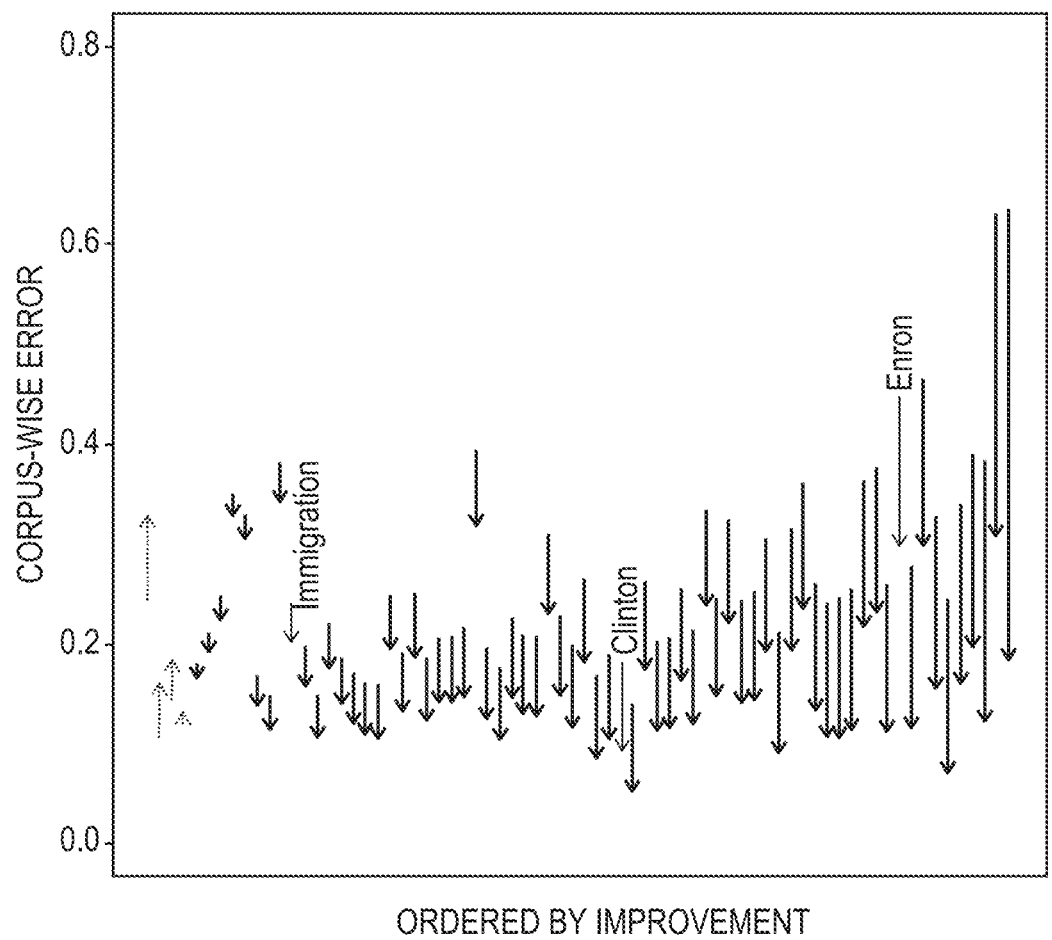
FIG. 8B depicts a comparison of estimation errors in document quantifications using an unimproved and an improved estimation approach in accordance with various embodiments.

Finally, FIG. 8B depicts a more detailed analysis of the error in estimating $\pi^U$ (vertically) using the unimproved estimation approach compared to the improved estimation approach (horizontally, ordered by the size of the improvement). The length of each arrow represents the average improvement over the 100 separate analyses of subsets of each of the 72 data set. In all but three cases, the arrows face downward; this indicates that on average the improved estimation approach almost always outperforms the unimproved one. Overall, a 35.7% average corpus-wide improvement is observed utilizing the unimproved approach.

Accordingly, estimations of the category proportions may be significantly improved using nonparametric estimation in conjunction with feature extraction and/or matching as described above. The improvement is achieved without the need for tuning or using any model-dependent methods of individual classifications. In addition, the improved estimation approach loosens the key assumptions of the unimproved approach while creating new numerical representations of each of the documents specifically tuned to reduce the mean-square errors of multi-category, nonparametric quantification. It should be noted that various approaches described herein may be profitably applied in other domains as well. For example, the dimension-reduction approach 502 may be profitably used for data visualization. For visualizing data on partisanship, the improved estimation approach may be applied to find the two-dimensional projection that maximally discriminates between Democrats, Republicans and Independents, and simultaneously contains minimal redundancy. The relevant clusters may then become more visible, and may be paired with a data-clustering algorithm on the two-dimensional projection for additional visualization or analysis purposes. The dimension-reduction approach 502 may also be applied in the study of causality. In causal inference, investigators often use nonparametric approaches such as matching, but there is considerable interest in performing this matching in an optimal feature space, such as in the space of predicted values for the outcome under the control intervention (such as in "predictive mean matching"). In addition, matching may be performed on the features derived in various embodiments of the present invention. The resulting causal estimator may have especially good properties, since it takes into account the relationship between the covariates and outcome (leading to low bias) while taking into account several independent sources of information (leading to low variance).

Representative Architecture

Figure 9:
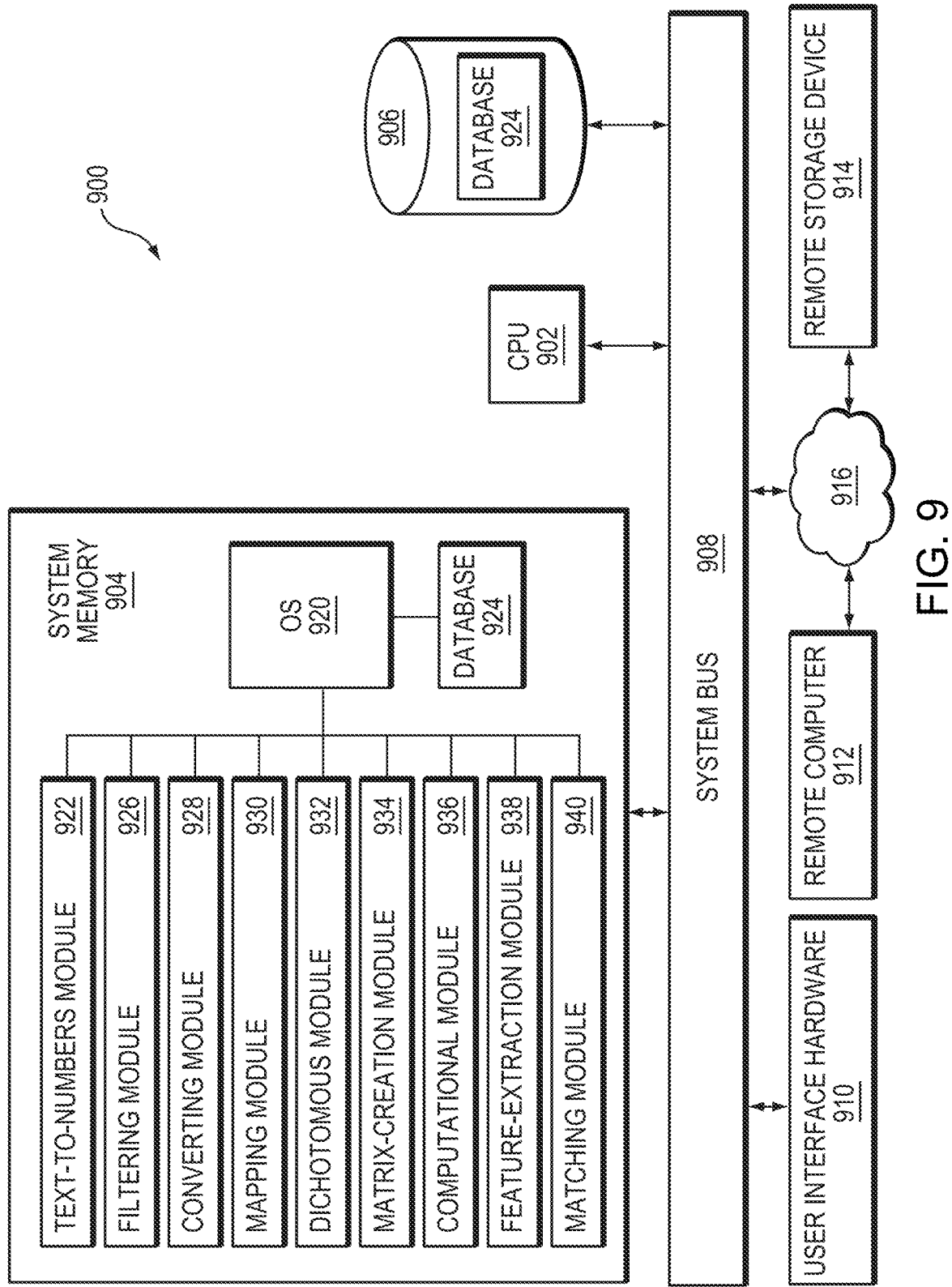
FIG. 9 is a block diagram illustrating a facility for performing estimations of document quantifications in a data set in accordance with various embodiments.

Methods for estimating category proportions in a data set in accordance herewith can be implemented in any suitable combination of hardware, software, firmware, or hardwiring. FIG. 9 illustrates an exemplary embodiment utilizing a suitably programmed general-purpose computer 900. The computer includes a central processing unit (CPU) 902, system memory 904, and non-volatile mass storage devices 906 (such as, e.g., one or more hard disks and/or optical storage units). The computer 900 further includes a bidirectional system bus 908 over which the CPU 902, memory 904, and storage devices 906 communicate with each other and with internal or external input/output devices, such as traditional user interface components 910 (including, e.g., a screen, a keyboard, and a mouse) as well as a remote computer 912 and/or a remote storage device 914 via one or more networks 916. The remote computer 912 and/or storage device 914 may transmit any document format (e.g., text, audio, and/or video data encapsulated in files, streams, database entries, or any other suitable data format) to the computer 900 using the network 916.

The system memory 904 contains instructions, conceptually illustrated as a group of modules, that control the operation of CPU 902 and its interaction with the other hardware components. An operating system 920 directs the execution of low-level, basic system functions such as memory allocation, file management and operation of mass storage devices 906. At a higher level, one or more service applications provide the computational functionality required for estimating category proportions in a data set. For example, as illustrated, upon receiving a query, via the user interface 910, from a user, the system may communicate with the storage devices 906, remote computer 912 and/or remote storage device 914 to receive documents associated with the query. The retrieved data may then be electronically stored in the system memory 904 and/or storage devices 906. In various embodiments, a text-to-numbers module 922 then retrieves the stored documents and convert the text therein to numerical variables as described above; the computer 900 may include a database 924 (in the memory 904 and/or storage devices 906) relating the numerical variables to the corresponding text. For example, the database 924 may be organized as a series of records each of which classifies a numerical variable as a particular text in the received documents, and which may contain pointers to the file or files encoding the numerical variable in a suitable manner, e.g., as an uncompressed binary file. In one embodiment, the text-to-numbers module 922 cooperates with a filtering module 926 that preprocesses the documents to filter the documents and retain only the information of interest. For example, as described above, the filtering module 926 may be designed to retain English documents relating to a specific topic only. In addition, the computer 900 may further include a converting module 928 to convert the text within the filter and/or unfiltered documents to lowercase (so that "These" and "these" are recognized as the same) and remove all punctuation marks to improve ease of analysis of the documents. Further, the computer 900 may include a mapping module 930 that maps a word to its stem to further reduce the language complexity as described above. For example, the mapping module 930 may reduce "consist," "consisted," "consistency," "consistent," "consistently," "consisting," and "consists" to their stem—i.e., "consist." The computer 900 may then implement a dichotomous module 932 to summarize the text preprocessed by the filtering module 926, converting module 928, and/or mapping module 930 as a set of dichotomous variables. In various embodiments, the dichotomous variables may then be transmitted to a matrix-creation module 934 to create a document-feature matrix (such as F and $\underline{F}$ as described above). Subsequently, the computer 900 may implement a computational module 936 to compute various feature vectors (such as $S_L$, $S^U$, $X^L$, $X^{L'}$ and $\widehat{\pi^U}$) and apply a linear regression (e.g., $\pi^U = (X^{U'}X^U)^{-1}X^{U'}S^U$) as described above to estimate the category proportions of the documents retrieved from the storage devices 906, remote computer 912 and/or remote storage device 914. In various embodiments, the computer 900 further includes a feature-extraction module 938 to perform feature extraction as described above. For example, the feature-extraction module 938 may first replace the discrete feature space with a continuous feature space having document-level "global vectors as described above and incorporated with the matrix-creation module 934 to project the document-feature matrix created thereby to a lower dimensional subspace matrix using a projection matrix. In addition, the feature-extraction module 938 may optimize the projection matrix by maximizing both category discrimination and feature discrimination above. Finally, the computer 900 may include a matching module 940 to perform matching as described above. For example, the matching module 940 may construct a matched set that closely resembles the unlabeled set based on the labeled set such that the distance between $\|X^U - X^L\|$ is reduced. Subsequently, the output from the feature-extraction module 938 and/or matching module 940 may be the computational module 936 to compute various feature vectors and apply the linear regression as described above to estimate the category proportions of the documents retrieved from the storage devices 906, remote computer 912 and/or remote storage device 914. The proportion estimation may then be provided to the user via the user interface 910. As described above, embodiments of the computer 900 implementing the feature-extraction module 938 and/or matching module 940 may advantageously estimate the proportion of retrieved documents in each of a plurality of labeled categories with improved accuracy compared to conventional approaches.

More generally, the computer shown in FIG. 9 is representative only and intended to provide one possible topology. It is possible to distribute the functionality illustrated in FIG. 9 among more or fewer computational entities as desired. The network 916 may include a wired or wireless local-area network (LAN), wide-area network (WAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include the cellular telecommunications infrastructure, WiFi or other 802.11 protocol, Bluetooth, Zigbee, IrDa or other suitable protocol. Furthermore, components of the system may communicate through a combination of wired or wireless paths.

Any suitable programming language may be used to implement without undue experimentation the analytical functions described within. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

In sum, the representative computer 900 may facilitate more accurate performance for applications relating to item categorization and classification, interpretation (e.g., of the content of the items and what this suggests), and/or retrieval of computational and real objects subject to automated analysis. For example, documents, such as the Enron email data set, newspaper editorials, and/or blog posts, as described above may be first retrieved by the computer 900; the computer 900 can then search the documents to filter out information that is not of interest. Subsequently, the computer 900 may perform various computation and/or analysis as described above to estimate the proportion of documents in each of the categories. The estimation is particularly useful in social science when aggregate generalizations about populations of documents are of more interest.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of computationally estimating a proportion of data elements in a plurality of data categories, the method comprising:
   (a) receiving and electronically storing a first set of elements, each element in the first set being computationally assigned to one of the plurality of categories and having one of a plurality of feature profiles computationally associated therewith but not being computationally assigned to one of the plurality of categories;
   (b) receiving and electronically storing a second set of elements, each element in the second set having one of the feature profiles computationally associated therewith;
   (c) computationally defining a continuous feature space having a plurality of numerical variables representing the plurality of feature profiles in the first set, the feature space being configured to discriminate between the categories and the feature profiles;
   (d) computationally constructing, based at least in part on the first set, a matched set that substantially resembles the second set, each element in the matched set being associated with a plurality of numerical variables representing a plurality of feature profiles associated therewith; and
   (e) estimating a distribution of the elements in the second set over the categories based at least in part on (i) the numerical variables associated with the feature profiles in the matched set, and (ii) the feature profiles associated with the elements in the second set.

2. Apparatus for computationally estimating a proportion of data elements in a plurality of data categories, the apparatus comprising:
a computer memory;
a non-transitory storage device for data storage and retrieval; and
a computer processor configured to:
(a) receive and electronically store a first set of elements in the memory, each element in the first set being computationally assigned to one of the plurality of categories and having one of a plurality of feature profiles computationally associated therewith;
(b) receive and electronically storing a second set of elements in the memory, each element in the second set having one of the feature profiles computationally associated therewith but not being computationally assigned to one of the plurality of categories;
(c) computationally define a continuous feature space having a plurality of numerical variables representing the plurality of feature profiles in the first set, the feature space being configured to discriminate between the categories and the feature profiles;
(d) computationally construct, based at least in part on the first set, a matched set that substantially resembles the second set, each element in the matched set being associated with a plurality of numerical variables representing a plurality of feature profiles associated therewith; and
(e) estimate a distribution of the elements in the second set over the categories based at least in part on (i) the numerical variables associated with the feature profiles in the matched set, and (ii) the feature profiles associated with the elements in the second set.

3. The apparatus of claim 2, wherein the computer processor is further configured to computationally create, with respect to the feature space, an element-feature matrix data structure having rows for at least some of the elements in the first and second sets and columns for the feature profiles associated therewith.

4. The apparatus of claim 2, wherein the computer processor is further configured to computationally create a projection matrix data structure for projecting the element-feature matrix onto a lower-dimensional subspace matrix data structure, wherein the distribution of the elements in the second set over the categories is estimated based at least in part on the numerical variables in the lower-dimensional subspace matrix data structure.

5. The apparatus of claim 4, wherein the computer processor is further configured to optimize the projection matrix by maximizing an equally weighted sum of a category-discrimination metric and a feature-discrimination metric.

6. The apparatus of claim 5, wherein the computer processor is further configured to optimize the projection matrix using the Hooke-Jeeves algorithm.

7. The apparatus of claim 4, wherein the projection is linear, nonlinear or random.

8. The apparatus of claim 2, wherein the computer processor is further configured to:
(i) identify, for each element in the second set, three nearest neighbors among the elements from the first set; and
(ii) identify the elements in the first set that are closer than a median nearest neighbor among the three nearest neighbors of all elements in the second set, wherein the matched set is constructed by pruning out the elements that are not identified in steps (i) and (ii) in the first set.

9. The apparatus of claim 2, wherein the computer processor is further configured to filter the elements in at least one of the first or second set as so to retain information of interest only.

10. The apparatus of claim 2, wherein the elements in the first and second sets comprise text and the computer processor is further configured to convert the text to lowercase and removing punctuation marks.

11. The apparatus of claim 2, wherein the elements in the first and second sets comprise text and the computer processor is further configured to map a word to its stem.

12. The apparatus of claim 2, wherein the computer processor is further configured to summarize the feature profiles in at least one of the first or second set as a set of dichotomous variables.

13. The apparatus of claim 2, wherein the distribution of the elements in the second set over the categories is not constrained to be the same as a distribution of the elements in the first set over the categories.

14. The apparatus of claim 2, wherein the distribution of the elements in the second set over the categories is unbiased.

15. The apparatus of claim 2, wherein the computer processor is further configured to store the distribution of the elements in the second set over the categories on at least one of the computer memory or the storage device.

16. The apparatus of claim 2, wherein the elements in the first and second sets comprise at least one of text, audio, or video data encapsulated in at least one of files, streams, or database entries.

17. The apparatus of claim 16, wherein the feature profiles indicate whether certain words occur in the text.

18. The apparatus of claim 16, wherein the feature profiles indicate whether certain combinations of words occur in the text.

19. The apparatus of claim 16, wherein the text is unstructured.

20. The apparatus of claim 2, wherein the computer processor is further configured to analyze at least some of the elements in the first set or the second set to obtain the feature profiles associated with said elements.

21. The apparatus of claim 2, wherein the computer processor is further configured to estimate the distribution of the elements in the second set over the categories without assigning the elements in the second set to the categories individually.

22. The method of claim 1, further comprising computationally creating, with respect to the feature space, an element-feature matrix data structure having rows for at least some of the elements in the first and second sets and columns for the feature profiles associated therewith.

23. The method of claim 22, further comprising computationally creating a projection matrix data structure for projecting the element-feature matrix onto a lower-dimensional subspace matrix data structure, wherein the distribution of the elements in the second set over the categories is estimated based at least in part on the numerical variables in the lower-dimensional subspace matrix data structure.

24. The method of claim 23, further comprising optimizing the projection matrix by maximizing an equally weighted sum of a category-discrimination metric and a feature-discrimination metric.

25. The method of claim 24, wherein the projection matrix is optimized using the Hooke-Jeeves algorithm.

26. The method of claim 23, wherein the projection is linear, nonlinear or random.

27. The method of claim 1, wherein step (d) comprises:
(i) identifying, for each element in the second set, three nearest neighbors among the elements from the first set; and
(ii) identifying the elements in the first set that are closer than a median nearest neighbor among the three nearest neighbors of all elements in the second set,
wherein the matched set is constructed by pruning out the elements that are not identified in steps (i) and (ii) in the first set.

28. The method of claim 1, further comprising filtering the elements in at least one of the first or second set as so to retain information of interest only.

29. The method of claim 1, wherein the elements in the first and second sets comprise text, the method further comprising converting the text to lowercase and removing punctuation marks.

30. The method of claim 1, wherein the elements in the first and second sets comprise text, the method further comprising mapping a word to its stem.

31. The method of claim 1, further comprising summarizing the feature profiles in at least one of the first or second set as a set of dichotomous variables.

32. The method of claim 1, wherein the distribution of the elements in the second set over the categories is not constrained to be the same as a distribution of the elements in the first set over the categories.

33. The method of claim 1, wherein the distribution of the elements in the second set over the categories is unbiased.

34. The method of claim 1, further comprising storing the distribution of the elements in the second set over the categories on a computer storage medium.

35. The method of claim 1, wherein the elements in the first and second sets comprise at least one of text, audio, or video data encapsulated in at least one of files, streams, or database entries.

36. The method of claim 35, wherein the feature profiles indicate whether certain words occur in the text.

37. The method of claim 35, wherein the feature profiles indicate whether certain combinations of words occur in the text.

38. The method of claim 35, wherein the text is unstructured.

39. The method of claim 1, further comprising analyzing at least some of the elements in the first set or the second set to obtain the feature profiles associated with said elements.

40. The method of claim 1, wherein the distribution of the elements in the second set over the categories is estimated without assigning the elements in the second set to the categories individually.

* * * * *